Oct. 25, 1949.

M. E. GRINWALD 2,486,275

MACHINE FOR HARVESTING AND BALING UNDERWATER PLANT LIFE

Filed June 26, 1948

INVENTOR.
MATHIAS E. GRINWALD
BY John W. Michael
ATTORNEY

Oct. 25, 1949.　　　　　M. E. GRINWALD　　　　　2,486,275
MACHINE FOR HARVESTING AND BALING
UNDERWATER PLANT LIFE

Filed June 26, 1948　　　　　　　　　　　　3 Sheets-Sheet 2

INVENTOR.
MATHIAS E. GRINWALD
BY John W. Michael
ATTORNEY

Oct. 25, 1949.

M. E. GRINWALD 2,486,275

MACHINE FOR HARVESTING AND BALING
UNDERWATER PLANT LIFE

Filed June 26, 1948

INVENTOR.
MATHIAS E. GRINWALD
BY John W. Michael
ATTORNEY

Patented Oct. 25, 1949

2,486,275

UNITED STATES PATENT OFFICE 2,486,275

MACHINE FOR HARVESTING AND BALING UNDERWATER PLANT LIFE

Mathias E. Grinwald, Hartland, Wis.

Application June 26, 1948, Serial No. 35,390

10 Claims. (Cl. 56—8)

This invention relates to improvements in machines for harvesting, removing, and baling of under-water plant life and weeds.

In many of the inland lakes the growth of under-water weeds and plant life is so profuse as to render the lakes unusable for boating and swimming. This condition is particularly prevalent in the shallow portions of the lake where it interferes with the use of piers or docks jutting into the lake from the shoreline. At certain seasons the weeds break loose and float on the surface of the water and are blown by the wind to the leeward shores and form in heavy floating masses, making navigation substantially impossible. It has been the custom of lake frontage owners to rake this floating mass of weeds up on the shoreline where after drying they may be burned or otherwise disposed of. The labor involved in this operation is arduous, costly, and ineffective.

It is an object of this invention, therefore, to provide a machine for stripping weeds from the bottom of the lake, gathering the weeds so stripped and other weeds floating on the surface of the lake, compressing the weeds so gathered to remove a substantial portion of the water and forming the weeds into cakes or bales which may be readily handled and converted into fertilizer or used for other purposes.

Another object of the invention is to provide a machine for harvesting and baling under-water plant life which while of rugged construction may be easily maneuvered and operated by a relatively small crew.

These objects are accomplished by providing a scow or barge which is propelled and maneuvered by side paddle wheels. On one end of the barge there is movably mounted a screen-type scoop provided with rake-like teeth along its lower edge. The scoop moves from a low position below the bottom of the scow to a discharge position above the deck of the scow. The operation of the scoop is hydraulically controlled so that it may be stopped in any desired position between these extremes. This permits a variable adjustment of its depth in the water during the gathering of the weeds. It is preferable to mount the scoop so that as it swings through the substantially vertical position it will by force of gravity pivot rapidly through a small arc and thus provide a throwing action to eject the weeds and other material positioned on the screen of the scoop. On the deck of the barge at the discharge station of the scoop there is positioned a plunger-type press or bale which has a charging platform or hopper. When the weeds are discharged from the scoop they fall on this platform from whence they may be raked by crew members into the opening of the press. The press has a rod-type extraction box which permits water to be expressed from the weeds as they are compressed. It is preferable to either operate the press by a low pressure high speed charging system and a high pressure low speed compressing system, or to provide an additional cake-forming box. In the latter event an additional plunger and rod-type box is placed in alinement with the extraction box. A hydraulically operated gate separates the two boxes. With this arrangement, while weeds are being charged into the extraction box, the high pressure cake-forming press may be separately operated. This speeds up the entire operation of the extraction and cake-forming operation. The power for operating the paddles, scoop, and presses is furnished by a gasoline motor which operates a plurality of hydraulic pumps of a positive displacement nature. Some of these pumps may be gear operated and some piston operated, depending upon pressure requirements. All the pumps are connected to a single oil supply reservoir. One pair of pumps is connected to a single shaft to act as a unit. Such unit provides the power for the hydraulic motors which operate the paddle wheels. A third pump is connected in the system for operating the hydraulic lift and control for the scoop. A fourth pump is connected in the system for operating the high speed low pressure plunger for the press and the hydraulic lift for the press gate. A fifth pump is connected in the circuit for operating the low speed high pressure plunger for the cake-forming press. All of the hydraulic circuits are controlled by four-way valves automatically movable to neutral position. These valves are arranged in two stations. By the valves in the main control station: the individual paddle wheels may be caused to rotate in unison in either direction, separately rotated in opposite directions, or only one rotated at a time in either direction; the scoop lowered, raised and discharged; and the cake-forming press operated. Thus one operator maneuvers the barge and in connection with such maneuvering operates the scoop. He can also control the operation of the cake-forming press when it has been charged. By the valves in the auxiliary station the high speed low pressure press may be operated and the gate opened or shut. The auxiliary station is adjacent the charging platform and the crew men, who are raking the weeds into the press opening, can readily control these operations.

In the operation of the machine the scoop is first lowered to the desired depth depending upon the length of the weeds, contour of the bottom, and depth of the water along the particular course chosen. The barge is then propelled forwardly along the desired course. As a result of this forward movement the toothed edge of the scoop catches the weeds and rips them from the bottom. The weeds are held against the screen portion of the scoop by the pressure of the water. Any weeds floating on the surface of the water will be gathered and likewise held against the screen portion of the scoop. When the course is completed or when a full load of weeds is lodged in the scoop the forward motion of the barge abruptly terminates by reversing the paddles and at the same time the scoop is raised and swung to the discharge point above the charging platform. The scoop is then lowered to the desired operating position and the forward motion again commenced. During the forward motion of the barge, the weeds deposited on the charging platform are raked into the extraction press and the high speed low pressure plunger intermittently operated to force the weeds into the extracting box. When the extracting box is completely charged and the water in the weeds therein is extracted to the degree permitted by the high speed low pressure plunger, the gate is opened and the bundle of weeds is forced by the low pressure plunger into the cake-forming box. The low pressure plunger is then withdrawn and the gate closed. The low speed high pressure piston is then operated to further extract water from the weeds and compress them into cakes. Thereafter the high pressure plunger is withdrawn from the cake-forming box so that the cake will be discharged from the end of the box when the next charge of weeds from the extraction box is pushed into the cake forming box.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawings, in which:

Figure 6:
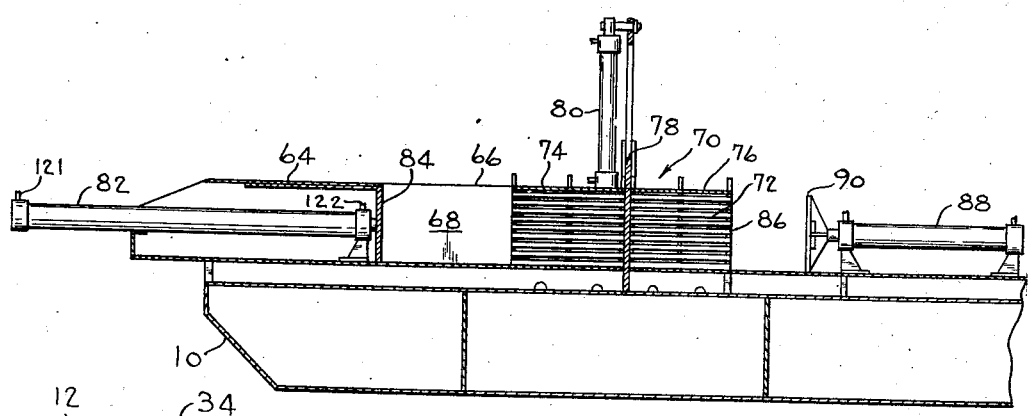
Fig. 6 is an enlarged fragmentary, longitudinal, sectional view showing the loading platform and extraction press comprising a part of such machine.

Referring to the drawings by reference numerals, the weed-harvesting machine is mounted on a scow or barge 10 which is preferably made of steel and totally enclosed. It may have watertight compartments (see Fig. 6) to prevent it from sinking if a leak occurs in one of the compartments. The barge 10 is propelled and maneuvered by side paddle wheels 12. Except for being left and right hand, the wheels are of identical construction and only one will be described.

Figure 5:
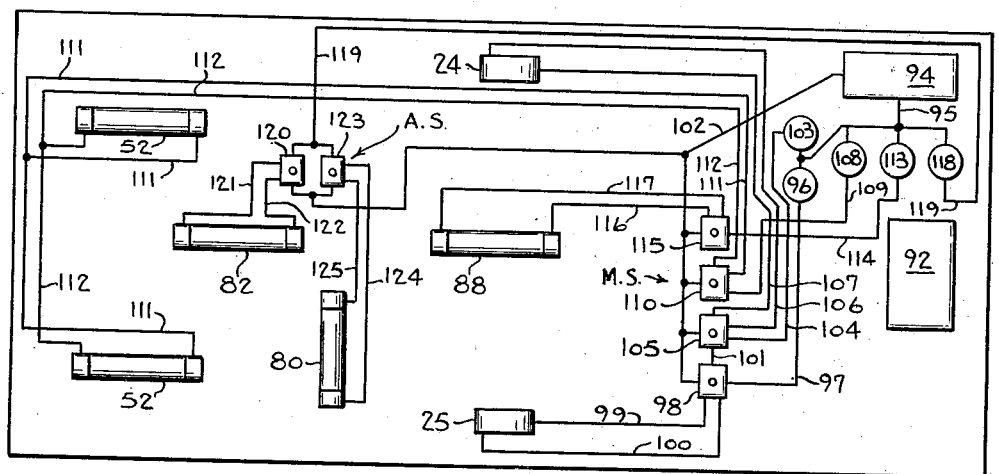
Fig. 5 is a diagrammatic view of the hydraulic control system used in such machine.
Figure 7:
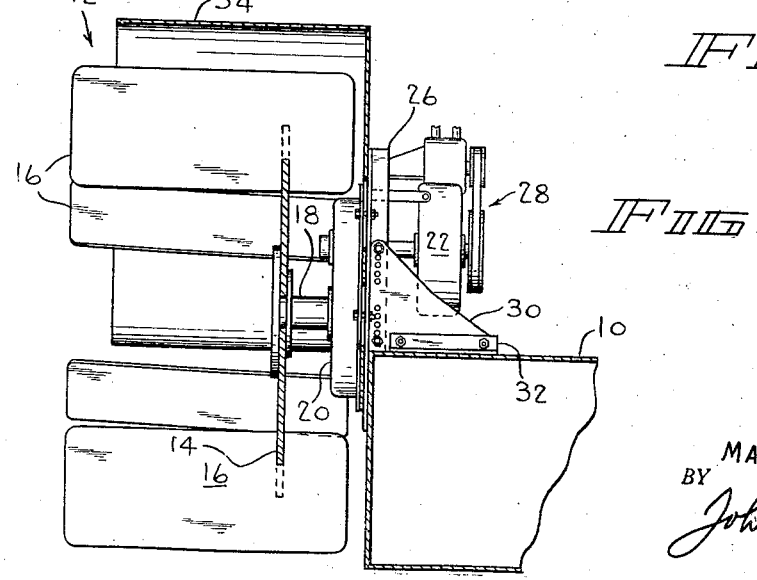
Fig. 7 is a fragmentary enlarged sectional view taken on the line 7—7 of Fig. 2.

As shown in detail in Fig. 7, the paddle wheel 12 consists of a central disk 14, in the radially extending slots of which plates 16 are welded or otherwise secured. The plates are at a slight pitch to the axis of rotation of the paddle wheel to aid in preventing churning and increase the maneuverability of the barge. The disk 14 is mounted on a hub 18 carried by a shaft extending from the casing 20 of a three to one reduction unit. This reduction unit, together with a thirteen to one reduction unit 22 and a hydraulic motor 24, are all mounted on a frame 26. A pulley and belt drive 28 connects the motor 24 and reduction unit 22. A pair of plates 30 extend laterally from the frame 26 and are bolted to brackets 32 on the deck of the barge 10. A guard 34 is also carried by the frame 26 and partially encloses the paddle wheel. Upon the removal of the outer bolts securing the plates 30 to bracket 32 the paddle wheel 12, frame 26, both reduction units and the motor may be swung as a unit upwardly and inwardly into the deck of the barge. The purpose of this is to permit the barge to be more easily transported by trailer from lake to lake. A series of bolt holes vertically spaced on the plates 30 permit a vertical adjustment of the frame 26 for raising and lowering the paddle wheel as desired. It has been found preferable, though not necessary, to place the axis of the pair of paddle wheels slightly abaft the center of the barge to increase its maneuverability. The paddle wheels are individually reversibly operated by a controlled hydraulic system, diagrammatically shown in Fig. 5 and hereafter described in detail.

The weeds and under-water plant life are engaged, torn from the bottom, and carried by a screen-type scoop 36. The scoop 36 is made of a plurality of spaced ribs 38 connected by transverse bars 40; the bottom transverse bar being provided with a plurality of teeth 42 adapted to engage weeds and other plant life and tear them from their roots or pull them by the roots from the bottom of the lake. A heavy metal screen 44 is mounted on the frame of the scoop and has a mesh of a size to readily permit the passage of water therethrough while retaining the weeds or usual under-water plant life thereon.

Figure 4:
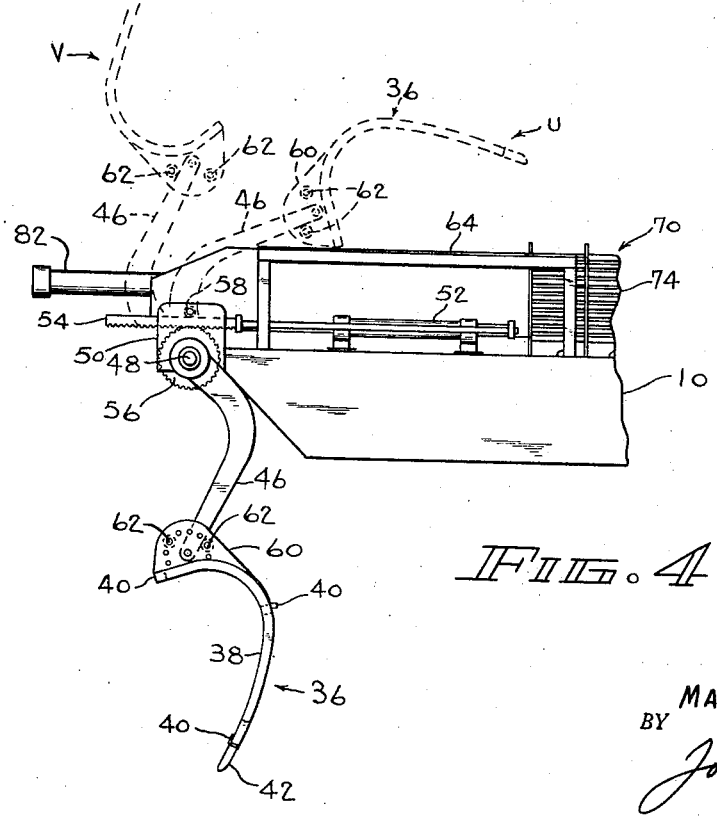
Fig. 4 is an enlarged fragmentary side elevation of the forward end of such machine.

The scoop is mounted so that it may be moved from a low position below the bottom of the scow to a discharge position above the deck of the scow. However, the scoop may be positioned at any selected place between these two extremes to accommodate it to varying conditions of depth and type of under-water plant life. To accomplish this the scoop 36 is loosely pivoted on the ends of a pair of spaced arms 46 rigidly fastened to a shaft 48. The shaft 48 is rotatably carried in bearing members 50 mounted on the bow of the barge. The rotation of the shaft 48 is controlled hydraulically by a pair of hydraulic rams 52, the pistons of which are connected to toothed racks 54 slidably mounted in the bearings 50 and engageable with gears 56 fixedly mounted on said shaft 48, the racks 54 being held in contact with gears 56 by rollers 58 also mounted on the bearings 50 above the racks 54. When the pistons of the rams 52 are forced outwardly of the cylinder, the racks 54 are moved toward the stern of the barge and the shaft 48 rotated clockwise (as viewed in Fig. 4). The length of the rams 52 is sufficient to swing the scoop 36 from the low position of Fig. 4 to the unloading position shown in dotted lines and indicated at U. The rams 52 may stop and hold the scoop at any intermediate point. In order to readily dislodge material carried in the scoop 36 it has a limited swing with respect to the arms 46 and as the arms pass a substantially vertical position (indicated in the dotted line at V) the scoop will flop over to a dumping position. To accomplish this a set of flanges 60 are fixed to two of the ribs 38 and the arms 46 pivotally mounted between these flanges. The flanges are provided with a plurality of alined apertures whereby a pair of abutment pins 62 may be adjustably positioned. It is preferable to protect the abutment pins 62 by surrounding them with rubber cushioning pads. The pins are spaced so that when the scoop is being raised there is an engagement between the lower pins 62 and the arms 46 until the vertical position is passed. Upon passing the vertical position, the scoop will swing about the ends of the arms 46 to dumping position and abruptly come to rest when the upper pins 62 contact the arm. The rams 52 are hydraulically connected in parallel and jointly controlled as will be hereinafter described in detail. It is possible to operate the scoop from one ram and one set of rack and gears. However, it has been found preferable to utilize two rams and two rack and gear sets and to space them as shown on opposite sides of the extracting press. This permits the use of a smaller diameter shaft and balances the torque load more efficiently. The scoop 36 discharges its load on to a loading platform 64, which is mounted above the deck substantially level with the opening to the extraction press. The loading platform has a centrally located opening 66 which directly communicates with the loading chamber 68 of the extraction press. Material which is discharged from the scoop on to the loading platform is manually raked into the opening 66 when it falls into the chamber 68. It is preferable to make the loading platform of perforated metal plate so that water may more easily run off. The extraction press or baler 70 is situated on the deck of the barge with the loading chamber 68 positioned directly below the opening 66. The walls of the extraction box of the press are formed by spaced metal bars 72 so that as material is pressed therein the water exuded from it will be readily discharged in all directions.

Figures 1, 2:
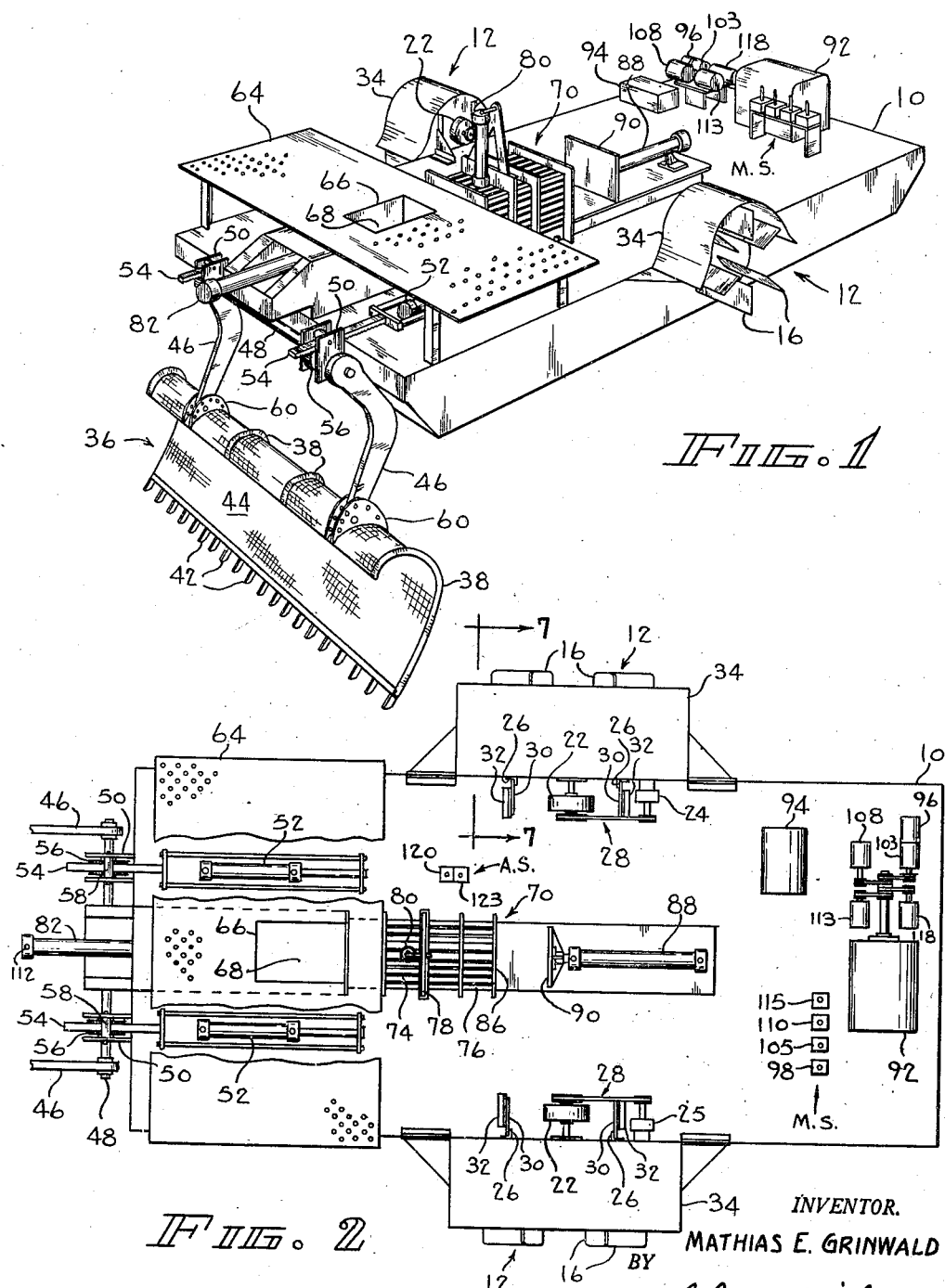
Fig. 1 is a perspective of a weed-harvesting machine embodying the present invention.
Fig. 2 is a top plan view of such machine with certain parts broken away and omitted for the sake of clarity in illustration.
Figure 3:
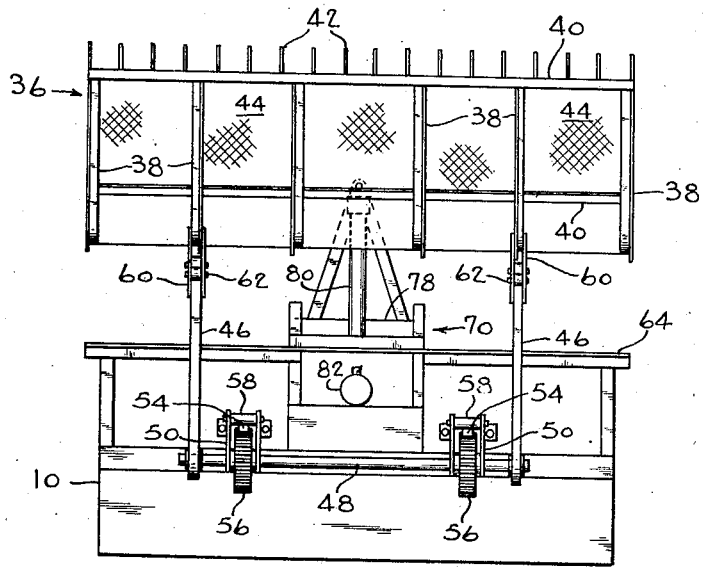
Fig. 3 is a fragmentary view in front elevation of such machine.

In the exemplification herein shown the extraction box is divided into two parts. The left hand box 74 (see Figs. 2 and 6) is operable at higher speeds and lower pressure for the quick extraction of the water and of a general compression of the material. The right hand box 76 is operated at low speeds and high pressure to perform a final extraction and to press the material into cakes of a size which may be easily handled. The boxes 74 and 76 are separated by a gate 78 hydraulically operated through a ram 80 from the lowered closed position of Fig. 6 to a raised open position. The gate 78 is guided in slides which are attached to the metal bars 72 of the extraction press. The forward end of the low pressure box 74 opens to the loading chamber 68. The ram 82 for the low pressure box 74 extends forward of the bow of the barge as it has to be long enough to move the plate 84 from the retracted position shown in Fig. 6 to an extended position adjacent the discharge opening 86 of the high pressure box 76. This movement is necessary to completely eject the cakes formed in the box 76. The high pressure box 76 is operated by hydraulic ram 88 positioned on the deck to the rear of and in alinement with the discharge opening 86. The high pressure ram 88 has a larger size diameter piston than the low pressure ram 82 and is long enough to force the plate 90 about three-quarters of the way into the high pressure box 76 and to withdraw and space it from the discharge opening 86 an amount sufficient to provide room for the discharge of a cake of material. The rams 80, 82, and 88 are separately hydraulically controlled by the hydraulic system set forth in Fig. 5 and hereinafter described. When the gate 78 is lowered to closed position the ram 82 is intermittently operated to force material positioned in the chamber 68 into the box 74 and compress it. This operation is carried on until the box 74 is approximately filled. During this operation the material will be considerably compressed and a large part of the water contained in it expelled. Thereafter the gate 78 may be raised to open position and the ram 82 operated to push the compressed mass from the box 74 into the box 76. The plate 84 is then withdrawn and the gate 78 closed. Thereafter the ram 82 may be again intermittently operated to charge the box 74. The main operator may then operate the ram 88 and urge the plate 90 forwardly into the box 76 to further compress material therein against the gate 78, expel more water, and compress the material into a cake which will retain its form when discharged. The high pressure ram 88 is then operated to withdraw the plate 90. The next time that the ram 82 is operated to force the material in low pressure box 74 into the box 76, the cake already in box 76 will be urged rearwardly thereof and will fall from the discharge opening 86 to the deck.

The hydraulic motor for each paddle wheel for the two lifting rams, for the low pressure and gate rams, and for the high pressure ram are all operated individually from hydraulic pumps. These pumps are continuously motivated by a gasoline motor 92 or other such source of rotative power. The hydraulic system which interconnects the pumps, control valves and motors is shown diagrammatically in Fig. 5. As shown in the drawings, crossing lines do not represent connected pipes unless such connection is indicated by a solid dot. The hydraulic system includes a common reservoir or tank 94 for the oil or other liquid. This is connected by pipe 95 to each pump. The pumps 96 and 103 are gear type, developing approximately two hundred pounds per square inch, and are operated in tandem from the same drive shaft. They furnish the power for operating paddle wheels 24 and 25. The pumps 108 and 113 are piston type pumps and develop approximately six thousand pounds per square inch, pump 108 furnishing the power for the lifting rams 52 and pump 113 furnishing the power for the high pressure ram 88. Pump 118 is a gear type pump and develops approximately eight hundred and fifty pounds per square inch to furnish the power for both the low pressure ram 82 and the gate ram 80. Each of the pumps are connected with their respective motors or rams through control valves of the four way type. The operating handle of each valve is biased to neutral position and moves from the neutral position to a forward or reverse flow position under manual control of an operator. The valves for controlling the paddle wheels, the scoop, and the high pressure ram are all positioned at the same main station indicated at MS. The valves for controlling the low pressure ram and the gate are located in an auxiliary station near the press as indicated by AS. Thus the operator at the main station MS can control the movement of the barge, the adjusting and lifting of the scoop, and the cake-forming operation. The crew at the auxiliary station, who are also engaged in raking weeds on the loading platform 64 into the press, can readily control the operation of the low pressure box and gate from station AS.

Pump 96 is connected to control valve 98 through pipe 97. From valve 98, pipe 99 leads to the gear type motor 25 and a return pipe 100 extends from the motor 25 back to the valve 98. The control valves 98 and 105 are interconnected, as shown at 101, and both have common return to the reservoir through the pipe 102. The gear pump 103 is connected to the control valve 105 through the pipe 104. The control valve 105 is connected to the gear motor 24 by the pipes 106 and 107. The control valve 105 is also connected to the reservoir 94 by the return pipe 102. As thus connected the control valve 98 can cause paddle wheel 25 to move in forward or reverse rotation. The control valve 105 can control the operation of paddle wheel 24 in the same manner. By moving both control valve handles simultaneously to their forward positions, both paddle wheels will operate in forward rotation. Reverse simultaneous rotation will occur if both handles are moved to the rear position. By moving one handle forwardly and one handle rearwardly the paddle wheels will be operated in opposite directions. This control of the paddle wheels results in a high degree of maneuverability of the barge. It may be stopped readily, turned rapidly, and may even be moved laterally to some degree.

The piston pump 108 is connected to control valve 110 by pipe 109. The control valve 110 is connected to the rearward end of each ram 52 by pipe 111 and is connected to the forward end of each ram 52 by pipe 112. This control valve is also connected to the reservoir 94 through the return pipe 102. By moving the operating handle of control valve 110 forwardly the rams 82 move forwardly to lower the scoop. The scoop may be stopped in any position by permitting the operating handle to automatically move to neutral position. By moving operating handle to the rear position, the pistons of the rams 52 are moved rearwardly to raise the scoop.

The piston type pump 113 is connected by pipe 114 to the control valve 115. This control valve in turn is connected by pipes 116 and 117 to the respective ends of the high pressure large diameter ram 88 and by return pipe 102 to the reservoir 94. By moving the operating handle of valve 115 forwardly, pressure is applied to the rearward end of ram 88 and the plate 90 is moved forwardly into the box 76. By moving the operating handle to the rear, the plate 90 is withdrawn from the box 76 to open the discharge opening 86.

The gear pump 118 is connected by pipe 119 to both control valves 120 and 123. The control valve 120 is connected by pipes 120 and 122 to opposite ends of low pressure ram 82. The control valve 123 is connected by pipes 124 and 125 to the opposite ends of the gate ram 80. Both of these valves are connected to the reservoir by return pipe 102. The operating handle of valve 120, when moved rearwardly, will cause the plate 84 to move rearwardly through the loading chamber 68 and into the box 74. However, if the gate 78 is closed the material will be compressed between the plate 84 and the gate and the rearward (of the barge) movement of the plate arrested. When this handle is moved forwardly the plate 84 will move forwardly and be returned to its charging position shown in Fig. 6. When the operating handle of valve 123 is moved to one position (say rearward) the ram 80 will lift the gate 78 to permit free access between box 74 and box 76. When this handle is moved to the opposite position (say forward), the gate will be closed.

The weed-harvesting machine is generally operated by a crew of two or three. One of the crewmen is positioned at the main station MS, while the other crew men are at the auxiliary station AS, one on either side of the press. It is desirable to first establish an area from which weeds are to be removed. This area is divided by course lines, the main operator using fixed points on shore to establish such course lines. The scow is maneuvered through the control of the paddle wheels until it is on the first course. A sounding having been previously taken the principal operator then lowers the scoop to the weed-catching position below water. It is desirable to keep the teeth 40 out of contact with the bottom but no harm will result if they should contact the bottom because they are made sufficiently rugged to withstand shock. However, consideration must be given to the type of bottom and if it is very rocky, care should be utilized to keep the teeth above the rock line level. The main operator then causes the barge to be propelled forwardly along the selected course. The teeth of the scoop will engage the lower part of the weeds or plant life and the pressure of the water passing through the screen will cause the upper part of the weed to be held against the forward surface of such screen. The weeds will thus either be severed at the teeth line or pulled by their roots from the bottom. The forward motion is continued until a good sized load of weeds has been accumulated in the scoop. The main operator can judge this from his knowledge of the density of the weed growth, the distance traveled, and by the action of the scow. Loads as heavy as fifteen hundred pounds can be lifted by the scoop. As soon as the main operator determines that the scoop should be discharged, he reverses the direction of the paddles rapidly bring the scow to a halt and perhaps backing it up preparatory to a new start, and at the same time causes the scoop to be raised and moved to the discharging position. After discharge the main operator then lowers the scoop to the selected position and again starts the forward motion of the barge. The two crew men stationed at auxiliary station AS then rake the weeds deposited on the discharge platform 64 into the loading chamber 68. When this chamber is full, one of these crew men operates control valve 120 and causes the plate 84 to move the weeds from this chamber into the box 74 compressing them against the gate 78. He then withdraws plate 84 to loading position. This operation is repeated until either all the weeds are removed from the discharge platform or the box 74 is completely filled. In the latter event this crew man then operates control valve 123 to open gate 78. With this gate open he causes the plate 84 to force the material in box 74 rearwardly into the box 76. After withdrawing plate 84 to charging position, he closes gate 78.

The main operator, during progress along the course, and after the box 76 has been charged, can operate control valve 115 and tightly compress the weeds in box 76 and form them into a cake. Upon withdrawal of plate 96, the cake so formed will be ejected the next time box 76 is charged from box 74.

It has been found that this method of harvesting weeds is very satisfactory. Weeds and the like can be removed prior to the time of season when they normally break loose or may be picked up even while floating in masses. It does not in any way pollute the water such as is the case with chemicals. Protection can be given to any animal life which has been gathered in the scoop. If a school of small fish has been caught along with the weeds, the operator can dump the scoop back in the water and in a short time reload after the fish have escaped. The weeds or other material are greatly compressed in volume and made easy and light to handle. In many instances (depending upon inherent characteristics) the plant life so harvested has a high nitrogen content and makes an excellent fertilizer and mulch.

By rearranging the positioning of the pivotal connection between the scoop and the arms 46, and by repositioning the pins 62, the scoop may be balanced so that it will fall to a discharge position while the arms are raised but are still forward of the bow of the scow. A latch attachment may then be added to lock the scoop in raised material-holding position. Upon release of the latch the scoop will fall and discharge forwardly of the barge. This permits material picked up in the scoop to be deposited on the shoreline.

Although only on embodiment of the invention is shown and described herein, it will be understood that this application is intended to cover such changes or modifications as come within the spirit of the invention or scope of the following claims.

I claim:

1. A machine for harvesting, removing, and baling under water plants comprising a barge, a scoop mounted on said barge and movable from a plant-gathering position below the water-line of the barge to a discharging position over the deck of said barge, an extracting press on said barge having an opening below said discharging position, means for controlling movement of said barge along a desired course to cause said scoop to travel through the water to gather and hold therein under-water plants, means for moving said scoop from gathering position to discharging position, and means for controlling the operation of said extracting press.

2. A machine as claimed in claim 1 in which the propelling means comprises independently reversibly operable paddle wheels positioned at the sides of said barge.

3. A machine as claimed in claim 1 in which said extracting press has a low pressure extracting box and a high pressure cake-forming box separated by a gate, and two independently operable plungers one for each of said boxes.

4. A machine as claimed in claim 1 in which said scoop is pivotally mounted on the ends of two arms carried on a common shaft, said shaft being rotatably controlled by hydraulically operated rack and pinion means, there being abutment means for limiting the pivoting of the scoop relative to said arms whereby said scoop is permitted to swing from a plant-supporting position to a discharging position as said arms reach substantially vertical position.

5. A machine as claimed in claim 4 in which said abutment means consist of a resilient cushion to lessen the jarring effect as the pivoting action of said scoop is stopped in the discharging position.

6. A machine for harvesting under-water plants comprising a floating barge, a scoop having a screen-like body and toothed lower edge mounted on said barge, means for moving said scoop from gathering position in the water to discharging position above the water level, and means for moving said barge and scoop along a course to cause said scoop to travel through the water and gather and hold therein underwater plants.

7. A machine as claimed in claim 6 in which said scoop is swingably mounted on the ends of arms pivoted to said barge.

8. A machine as claimed in claim 6 in which said scoop is swingably mounted on raising and lowering arms carried by said barge and is swingable with respect to said arms from a plant-holding position to a discharge position, there being a locking mechanism to hold said scoop in the plant-holding position.

9. A machine as claimed in claim 6 in which the means for moving said scoop comprises a hydraulically controlled rack and pinion, and a shaft operated by said pinion on which said scoop is carried, said hydraulic control being capable of positioning said scoop any place between gathering and discharging positions.

10. A machine as claimed in claim 6 in which the means for moving said barge comprises a pair of side paddle wheels mounted on said barge, and hydraulic motors for driving said wheels, said wheels and motor being mounted on a swingably mounted bracket whereby said wheels may be tilted up and inwardly of the sides of said barge.

MATHIAS E. GRINWALD.

REFERENCES CITED

The following references are of record in the file of this patent:

UNITED STATES PATENTS

| Number | Name | Date |
| --- | --- | --- |
| 154,900 | Piper | Sept. 8, 1874 |
| 669,820 | Christen | Mar 12, 1901 |
| 1,259,456 | Judson et al. | Mar. 12, 1918 |
| 2,223,641 | Sanger | Dec. 3, 1940 |
| 2,322,865 | McDermott | June 29, 1943 |